Dec. 24, 1946.  A. C. SCHWAGER  2,413,195
HIGH POTENTIAL CURRENT TRANSFORMER MEANS
Filed Dec. 21, 1942
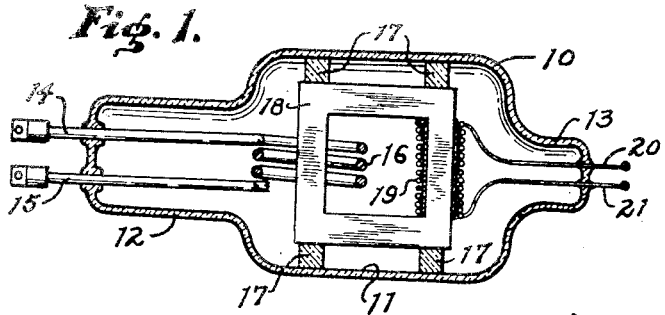
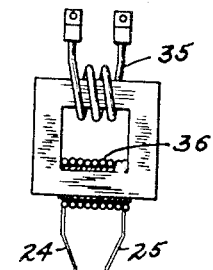
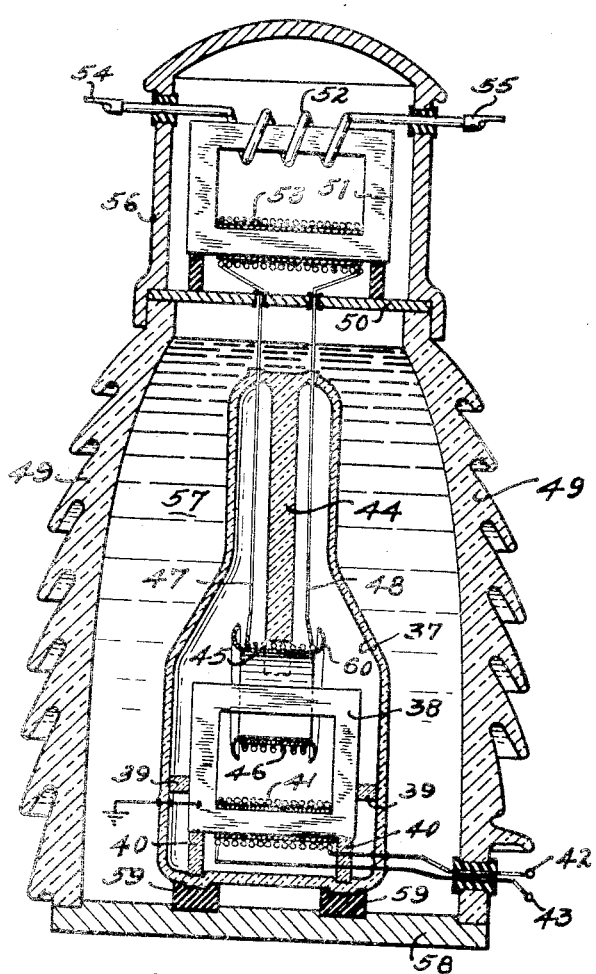
INVENTOR.
AUGUST C. SCHWAGER.
BY
Wm. H. Atkinson
ATTORNEY Patented Dec. 24, 1946

2,413,195

UNITED STATES PATENT OFFICE 2,413,195

HIGH POTENTIAL CURRENT TRANSFORMER MEANS

August C. Schwager, Millbrae, Calif., assignor to Pacific Electric Manufacturing Corporation, San Francisco, Calif., a corporation of California Application December 21, 1942, Serial No. 469,613

5 Claims. (Cl. 175—358)

My present invention relates to high potential current transformer means, and more particularly to an improved current transformer and system for use in connection with the operation of control apparatus responsive to current conditions upon a high potential power transmission line.

An object of the invention is to provide a current transformer of new and novel design for high potential heavy current power transmission lines which will be practical, efficient and more economical to manufacture than would be a comparable current transformer for use under the same conditions of operation.

Another object of the invention is to provide a new and novel current transformer of small size and simple construction in which an evacuated spacing between the primary and secondary windings is relied upon as a means to insulate the high potential primary winding from a secondary winding that operates at a substantially lower and safe voltage at ground potential.

Another object of the invention is to provide a current transformer that is particularly well adapted for use in connection with the so-called "minimum oil" and "air blast" types of high voltage circuit interrupter which operate in a zone of high potential and consequently do not require the conventional insulating bushings within which the current transformers of former design were customarily mounted.

Another object of the invention is to provide a transformer system for effecting an insulated current responsive control connection between a high potential power transmission line and a control circuit in which a current condition responsive to current conditions upon the high potential transmission line is inductively transmitted through an insulating vacuum to a control circuit operating at a safe grounded potential.

In the art to which the invention relates, current transformers are relied upon to provide a measure of the current flowing in a high voltage alternating current system and/or to provide a source of current for a system of control having relays and other instruments operating at a considerably lower potential. In the past, where these current transformers have been associated with extremely high voltage circuits, it has been the custom to mount the current transformer in the insulating bushings generally provided with the terminals of circuit breakers and like apparatus to insulate the apparatus operating at ground potential from the high potential circuit. However, due to recent trends, and particularly to developments in the so-called "minimum oil" circuit breakers and "air blast" circuit breakers which have their operating and circuit interrupting elements mounted and operating in the zone of high potential, the aforementioned insulating bushings have become unnecessary. Therefore, a different form of current transformer must be provided to meet this condition. Due to the high voltages involved, the cost of an independent transformer makes its use almost prohibitive, as such a transformer must still be provided with a large insulating bushing and an oil containing tank for its windings. For example, the primary current of these transformers is generally somewhere in the neighborhood of 600 amperes and, therefore, heavy conductors of approximately one square inch of cross-section must be used for the primary winding. The secondary winding of these transformers is usually designed for approximately five amperes and, consequently, a very small wire can be used for this winding. However, in order to prevent electrical break down between the primary winding and the core and the secondary winding of such a transformer, a large insulating space must be provided, and while this spacing is somewhat reduced when an oil or other insulating medium is used, the distance between the primary winding and the core must still remain relatively large in order to insure sufficient safety. This distance must be somewhere in the neighborhood of ten inches on a 115,000 volt circuit.

It has also been recognized that air under high pressure breaks down under electrical stress less easily than air at atmospheric pressure, and recently, as a solution to the above problem, it has been proposed to insulate the core and windings of a transformer by placing them in a suitable container under high air pressure. This will reduce the required spacing or clearance distance between the primary and secondary windings and the core of the transformer. While these transformers have the advantage that they avoid the fire hazard inherent in the use of an inflammable insulating oil, they still have the disadvantage that extra precautions must be taken to insure that the high air pressure surrounding the windings of the transformer is maintained at all times.

In accordance with the present invention and as distinguished from the above prior art practices, I propose to seal the entire transformer unit within a glass or other form of envelope from which the air is completely exhausted and use a high vacuum as the insulating medium between the primary and secondary windings and the core so that an evacuated space will be interposed between the two windings and/or between at least one of the windings of the transformer and the core. In this manner the spacing between the transformer windings and the core and the spacing between the two windings can be reduced to a minimum and, at the same time, a maximum factor of insulating safety will be provided.

In accordance with another aspect of the invention, I may employ a transformer of the above design in series with one or more transformers of conventional design that may be connected to operate in a zone of high potential and from which a relatively lower current may be taken into my improved insulating transformer by relatively smaller lead wires that can be more conveniently sealed in the wall of a glass or other type of evacuated envelope.

For a better understanding of the invention reference should be had to the accompanying drawing, wherein there is shown by way of illustration and not of limitation preferred embodiments thereof.

In the drawing:

Figure 1 is a diagrammatic sectional view showing one form of my invention,

Figure 2 is a similar view illustrating another form of my invention as connected in series with a current transformer of conventional design, and Figure 3 is a vertical sectional view showing an adaptation of my invention suitable for use in connection with minimum oil and air blast types of circuit breakers.

In Figure 1 of the drawing the invention is shown in simplified form as employing a suitable evacuated glass bulb or receptacle 10 in which the transformer is enclosed and sealed as a unit. The glass bulb 10 has an enlarged central body portion 11 from which reduced end portions 12 and 13 extend in opposite directions. Sealed in and passing through the extending end portion 12 of the bulb 10 there are two relatively large conductors 14 and 15 which provide lead in connections for a relatively small number of ampere turn forming convolutions 16 of the same conductor which form the primary winding of a transformer. Positioned within the enlarged portion 11 of the bulb 10 by means of suitable supports 17 and with one of its legs extending centrally through the convolutions 16 of the primary winding, there is a magnetic core 18 of suitable construction. This magnetic core 18 is shown as of rectangular shape and upon the other of its legs and wound in a suitably insulated manner, there is a secondary winding 19 having lead out wires 20 and 21 that are sealed in and extend outwardly through the end of the extending neck 13 of the evacuated glass bulb 10. With this arrangement it will be seen that the turns or convolutions 16 of the primary winding will be spaced from the core 18 of the transformer and thus provide an evacuated space between this winding and the core 18 that will effectively insulate the turns 16 of the primary winding from the core 18. At the same time, by extending the necks 12 and 13 upon the bulb 10 outwardly a safe distance, depending upon the voltage involved, the terminal ends of the conductors 14, 15 and 20, 21 may be spaced apart sufficiently to avoid any external arc-over around the vacuum insulated gap between the primary and secondary windings of the transformer. The transformer described above is one which might be connected directly to a high potential power transmission line with its primary winding carrying the full line current. However, since it is appreciated that there may be limitations in the size or character of the lead in conductors 14 and 15 that would preclude or make difficult the sealing of such conductors in the wall of an evacuated container, it is contemplated that resort may be had to the use of a conventional current transformer for the purpose of providing a current of reduced value that can be accommodated by lead in conductors of a size suitable for sealing in the wall of an evacuated container.

In Figure 2 of the drawing there is shown an embodiment of the invention in which both the primary winding and the secondary winding of my high potential insulating current transformer are each spaced from the magnetic core and insulated from the core and from each other by a high vacuum. As here shown, the transformer is enclosed within an elongated and evacuated bulb 22 having an extending neck 23 at one end in which primary current leads 24 and 25 are sealed. These current leads 24 and 25 form the input conductors of a primary winding 26 that is suitably mounted within the bulb 22 by means of a reentrant stem 27 formed within the bulb 22. At its other end the bulb 22 has an oppositely extending neck 28 in which lead out conductors 29 and 30 are sealed. These latter conductors 29 and 30 form the output conductors of a secondary winding 31 which, like the primary winding 26, is suitably supported within the bulb 22 by means of a second reentrant stem 32. With this arrangement it will be seen that the primary winding 26 and the secondary winding 31 will be spaced and insulated from each other. To complete an inductive coupling between the primary winding 26 and the secondary winding 31 the bulb 22 is shown as having a substantially centrally disposed magnetic core 33 that is positioned by means of supports 34 with its opposite legs disposed in spaced and substantially central relation with respect to the convolutions of the primary and secondary windings. In this transformer it is contemplated that the ratio of turns of the primary winding 26 and the secondary winding 31 will be substantially 1:1. However, it is conceivable that this ratio of transformation may be of any desired value, either in a step-up or step-down sense. In practice, it is customary to provide transformers for this service which have a secondary current output of approximately five amperes, as this value of current is very satisfactory for meters and relay control circuits. Therefore, as illustrated in this figure of the drawing, my improved transformer is shown as connected in series with a transformer of conventional design which has a heavy current carrying primary winding 35 and a secondary winding 36 that will provide a control current of substantially five amperes when the normal line current is flowing through its primary winding.

In Figure 3 of the drawing there is shown an embodiment of the invention which it is believed may find considerable use in connection with the control of high potential circuit breakers of the minimum oil or air blast type which, as previously suggested, may not employ the usual high potential insulating bushings such as are now required on circuit breakers of the oil insulated type. As here shown, the insulating transformer is enclosed within an evacuated glass bulb or envelope 37. The insulating transformer in this instance comprises a magnetic core 38 that is positioned within the bulb 37 by suitable supports 39 and 40. The core 38 carries a secondary winding 41 having leads 42 and 43 that extend through and are sealed in the wall of the bulb 37 near its bottom. At its upper end the bulb 37 is provided with a neck of reduced diameter having a reentrant stem 44 upon which there is suitably mounted a primary winding 45. This primary winding 45 has relatively large convolutions 46 that surround and are disposed in spaced relation with the upper leg of the magnetic core 38. Extending adjacent the reentrant stem 44 there are two lead-in conductors 47 and 48 that extend through and are sealed in the end of the upwardly extending neck of the bulb 37. In this arrangement, like that illustrated in connection with Figure 2, the insulating transformer is adapted to be connected in series with a transformer of conventional design, and in order to provide for the support and insulation of this conventional transformer, the bulb 37 is shown as disposed centrally within a bushing-type insulator 49 of porcelain or other suitable material. This will form a mechanical and insulating support for the conventional current transformer. The insulating bushing 49 has a plate 50 upon which a core 51 of the conventional transformer is supported. The core 51 of this latter transformer has a primary winding 52 and a secondary winding 53 that may be designed to provide a control current of any desired value, as will be determined by the normal current of the line conductor in which the primary winding 52 of this transformer may be connected. Terminals 54 and 55 carried by the primary winding 52 are here shown as insulated from and projecting through an enclosing cover 56 that is likewise insulated and supported in the zone of high potential at the upper end of the bushing 49. In connection with this latter arrangement it will be noted that the first stage or conventional transformer, together with its enclosing housing 56 and the power line conductors connected to the terminals 54 and 55 of the primary winding 52, will be effectively insulated from ground by means of the supporting insulator bushing 49. Now, in order to further insulate the high potential circuit and reduce the possibility of any creepage current or arc-over within the bushing 49 and externally of the tube 37, it is contemplated that the leads 42 and 43 of the secondary winding 41 of the insulating transformer may be passed through and sealed in the wall of the insulating bushing 49 to thus provide an oil tight receptacle that may be filled with an insulating oil or other medium 57. In this figure of the drawing the primary winding 45 is shown as provided with an electrostatic shield 60. This shield may be of any accepted form and will function to prevent any electrostatic discharge to the primary coil. The bottom of the insulating bushing 49 is shown as closed by a plate 58, but it will be understood that this closure may be provided by any suitable means and may constitute a part of other apparatus with which the insulating transformer is used. In this instance the evacuated glass bulb or envelope 37 is supported upon insulating blocks 59. However, it will be understood that the bulb 37 may be supported in many other ways. For example, it may be carried by shelf forming bosses formed integrally upon the inside wall of the bushing 49, or it may be suspended from the plate 50 which supports the core 51 of the conventional transformer. As an additional safety measure, it will be understood that if desired, the cores of the insulating transformers described above may be grounded, as indicated in Figure 3. In the case of high frequencies, or other conditions permitting, it is also conceivable that the magnetic core may be omitted altogether. This grounding connection may be purely a safety measure so that in the event of a flash-over, the high potential current will not damage associated instruments and apparatus or injure an attendant. In the case of extremely high potentials, it may also be desirable to employ and connect two or more of these insulating transformers in series so as to establish any number of stages of transformation and insulation.

Although the invention has been illustrated and explained in detail in conjunction with a specific application and as a current transformer for high potential alternating current systems, it is not necessarily limited to such a field of application. The invention quite generally shows a novel means for inductively coupling and insulating two circuits that operate at greatly different potentials. It will also be understood that the systems described can be used to transmit direct current impulses from the primary to the secondary or vice versa, and in this manner the transformer here disclosed could be used as the insulated inductive coupling means shown and described in U. S. Patent No. 2,301,765, issued November 10, 1942, to Roy Wilkins.

While I have, for the sake of clearness and in order to disclose the invention so that the same can be readily understood, described and illustrated specific devices and arrangements, I desire to have it understood that this invention is not limited to the specific means disclosed, but may be embodied in other ways that will suggest themselves to persons skilled in the art. It is believed that this invention is new and it is desired to claim it so that all such changes as come within the scope of the appended claims are to be considered as part of this invention.

Having thus described my invention, what I claim and desire to secure by Letters Patent is:

1. A current transformer for use on high potential circuits, comprising an evacuated envelope having a magnetic core mounted therein and surrounded by a vacuum, a primary winding mounted in loose coupled magnetic relation upon said magnetic core within said evacuated envelope and adapted to be excited by the line current of a high potential circuit, and a secondary winding mounted upon said core in close coupled inductive relation with said magnetic core, characterized by the fact that said primary winding will be electrically insulated from said magnetic core and from said secondary winding solely by the evacuated space therebetween within said evacuated envelope.

2. In a current transformer for tapping a high potential circuit, the combination of an evacuated sealable container of non-conducting material, a primary coil having relatively large turn forming convolutions disposed within said container and having extending terminal ends adapted for connection to a high potential circuit, a closed magnetic core having one leg extending centrally through and in loose coupled magnetic relation with the large turn forming convolutions of said primary coil, and a secondary coil mounted in close coupled magnetic relation upon another leg of said magnetic core, whereby said primary coil will be electrically insulated from said closed magnetic core and said secondary coil by a vacuum.

3. In a current transformer of the character described, the combination of an evacuated container, an electromagnetic core mounted within and supported by said container, a primary winding having large turn forming convolutions supported from a wall of said container and disposed in loose coupled inductive relation with a portion of said electromagnetic core, and a secondary winding disposed in close coupled inductive relation with another portion of said magnetic core and in spaced relation with said primary winding, whereby said primary winding will be insulated from said electromagnetic core and from said secondary winding by an evacuated space therebetween.

4. A current transformer for obtaining metering and control current values of low ratio error from high potential power transmission circuits, the combination of a primary winding having large turn forming convolutions adapted to be connected to a high potential circuit, a closed magnetic core having a portion extending through the large turn forming convolutions of said primary winding and in spaced loosely coupled magnetic relation therewith, a secondary winding disposed in spaced relation with said primary winding and wound in close coupled relation about another portion of said closed magnetic core, and a sealed and evacuated enclosure forming means completely surrounding and supporting said primary winding and said magnetic core in spaced relation to each other, whereby said high potential primary winding will be effectively insulated from said magnetic core and said secondary windings by the evacuated space therebetween.

5. A current transformer for obtaining metering and control current values of low ratio error from high potential power transmission circuits, the combination of a primary winding having large turn forming convolutions adapted to be excited by a current at high potential, a closed magnetic core having a portion thereof extending through and in loosely coupled magnetic relation with the large turn forming convolutions of said primary winding, a secondary winding disposed in spaced relation with said primary winding and wound in close coupled magnetic relation upon another portion of said closed magnetic core, an evacuated enclosure forming means having terminal leads for said windings extending through opposite walls thereof and completely surrounding and supporting said primary winding and said magnetic core in spaced relation to each other, whereby said high potential primary winding will be effectively insulated from said magnetic core and said secondary winding by an evacuated space therebetween, and a bushing-like support containing a fluid insulating medium within which said evacuated enclosure forming means is submerged to prevent current creepage between the terminals of said primary and said secondary windings.

AUGUST C. SCHWAGER.